US005995014A

United States Patent [19]

DiMaria

[11] Patent Number: 5,995,014

[45] Date of Patent: Nov. 30, 1999

[54] BIOMETRIC INTERFACE DEVICE FOR UPGRADING EXISTING ACCESS CONTROL UNITS

[75] Inventor: Peter C. DiMaria, Ellington, Conn.

[73] Assignee: Accu-Time Systems, Inc., Ellington, Conn.

[21] Appl. No.: 09/000,624

[22] Filed: Dec. 30, 1997

[51] Int. Cl.[6] .......... G06K 9/00

[52] U.S. Cl. .......... 340/825.31; 340/825.34; 382/116; 382/124; 382/125; 382/115; 382/117; 380/23

[58] Field of Search .......... 340/825.31, 825.34; 382/116, 124, 125, 115, 117; 380/23

[56] References Cited

U.S. PATENT DOCUMENTS

| | | | |
|---|---|---|---|
| 3,581,282 | 5/1971 | Altman | 340/149 |
| 4,151,512 | 4/1979 | Riganati et al. | 340/146.3 |
| 4,210,899 | 7/1980 | Swonger et al. | 340/146.3 |
| 4,525,859 | 7/1985 | Bowles et al. | 382/5 |
| 4,993,068 | 2/1991 | Piosenka et al. | 340/825.34 |
| 5,055,658 | 10/1991 | Cockburn | 235/382 |
| 5,195,145 | 3/1993 | Backus et al. | 382/4 |
| 5,321,765 | 6/1994 | Costello | 382/125 |
| 5,335,288 | 8/1994 | Faulkner | 382/4 |
| 5,337,043 | 8/1994 | Gokcebay | 340/825.31 |
| 5,483,601 | 1/1996 | Faulkner | 382/115 |
| 5,552,766 | 9/1996 | Lee et al. | 340/541 |
| 5,559,504 | 9/1996 | Itsumi et al. | 340/825.3 |
| 5,594,806 | 1/1997 | Colbert | 382/115 |

FOREIGN PATENT DOCUMENTS

| | | |
|---|---|---|
| 2270586 | 3/1994 | United Kingdom . |
| 8702491 | 4/1987 | WIPO . |
| 9422371 | 10/1994 | WIPO . |

*Primary Examiner*—Brian Zimmerman
*Assistant Examiner*—Yves Dalencourt
*Attorney, Agent, or Firm*—Volpe and Koenig, P.C.

[57] ABSTRACT

A method and an apparatus for upgrading an existing personal control system. The upgrade is achieved by replacing the personnel data input unit of an existing personal control system with a biometric interface device capable of reading physical characteristic and an access control signal in the format of the existing personnel control system.

8 Claims, 14 Drawing Sheets

BIOMETRIC INTERFACE DEVICE FOR UPGRADING EXISTING ACCESS CONTROL UNITS

BACKGROUND OF THE INVENTION

1. Field of the Invention

The present invention relates to a method and apparatus for upgrading existing personnel control systems. More particularly, the present invention relates to replacing the interface units of existing personnel control units with a biometric interface capable of outputting a signal compatible with the format of the currently installed personnel control system.

2. Description of the Prior Art

Increasingly, security problems are becoming a more noticeable part of modern life. Security was once primarily the preserve of classified government installations, but increasing losses and calamity have forced the review of security equipment and procedures for government and industry. Cargo losses and the theft of corporate secrets cost industry billions of dollars annually. Public safety is endangered by the ability of intruders to access secured places, such as aircraft and airport buildings.

Personnel control and personal identification are daily problems, and continue to be the object of significant expenditures by organizations needing to identify employees, vendors, etc., who are to be allowed access to the secured areas. Typical personnel control applications include: computer center; radioactive or biological danger areas; controlled experiments; information storage areas; airport maintenance and freight areas; hospital closed areas and drug storage areas; apartment houses and office buildings; manufacturing facilities and construction sites; safety deposit boxes and vaults; and computer terminal entry and access to information.

Obtaining an individual's identity is a common problem in any access control application. Many existing personnel control applications establish a person's identity using a personal identification code or a card having encoded identification information. More recently, in order to increase security, some organizations are installing biometric devices with personnel control capabilities. These devices electronically scan a personal physical characteristic of an individual, such as a portion of the epidermis or human eye. After scanning a personal physical characteristic, these devices generate a pattern which is compared against a library of patterns that identifies the individuals permitted access to a controlled area.

For example, U.S. Pat. No. 3,581,282 discloses a palm print identification system. In one example, a number code, encoded on an I.D. card, uniquely identifies a palm of an individual. The system reads the I.D. card and the actual palm of the individual. The number code is used as an index to retrieve a stored palm print pattern. Then, the stored palm print pattern is compared to the fresh palm print pattern to verify the identity of the individual.

U.S. Pat. No. 4,210,899 discloses a fingerprint-based personnel control and identification apparatus. The apparatus reads a human fingerprint and transmits an electronic representation of the fingerprint to a centralized image processing unit. The centralized image processing unit determines access to certain areas, terminals or doors based on the specific fingerprint read.

U.S. Pat. No. 5,337,043 discloses a personnel control system using data stored in the form of a barcode. A fingerprint pattern of the keyholder is stored in the form of a barcode on the key. After the key is placed on the keyway of a terminal at a personnel control point and read, the keyholder may then be prompted to place a finger against the fingerprint reader. The fingerprint is scanned and compared at the access control point terminal with the key encoded information. If a match is made, the personnel control point decision and the keyholder identifying code are sent to a remote central processor or host computer. The central processor determines whether a keyholder is permitted to access a particular area at the particular time that the card is read. A signal indicating that access is granted or denied is sent to the terminal.

U.S. Pat. No. 5,195,145 provides an apparatus which scans a fingerprint and provides positive confirmation of an individual's identity at a particular location at a particular time. The terminal utilizes fingerprint scanners with magnetic cardreaders to reduce fraud in credit card transactions by sending the scanned card and fingerprint to a credit verification company.

All these new biometric devices are not compatible with the presently installed personnel control devices which establish a person's identity utilizing a personal identification code or encoded card. Often, presently installed devices must be deactivated or removed, which adds to the expense of installing a new control access system. Therefore, there is a need for an inexpensive biometric interface device to upgrade existing personnel control units.

SUMMARY OF THE INVENTION

The present invention provides a biometric interface device for interfacing with an existing personnel control system of a type that utilize individualized stored data for the purpose of determining access authorization.

In one embodiment, the biometric interface device associates a library of personal physical characteristic topographical patterns, such as epidermal topographical patterns, with identification information stored in a memory. When a topographical pattern is read by the biometric interface device, it is compared against the entries of associated identification information stored in a memory unit. If there is a match, the identification information may be transmitted to a host computer in the format of the currently installed system. The host computer may use the identification information as an index to ascertain whether the individual is authorized to access a controlled area. For added security, the subject individual may also be required to input a personal code and present an identification document containing machine readable data to be scanned or read. If access is authorized, the host transmits an authorization signal in the format of the currently installed system.

Alternatively, the personal characteristic topographical pattern is stored on an identification document in a machine readable code. The terminal reads the document, scans the personal characteristic and performs a comparison. If there is a match, the identification information may be transmitted to a host computer in the format of the currently installed system. The host computer accesses the data base to obtain authorization information. If the individual is authorized, the host transmits an authorization signal.

DESCRIPTION OF THE PREFERRED EMBODIMENTS

The preferred embodiments are described with reference to drawing figures wherein like numerals represent like elements throughout.

Figure 1:
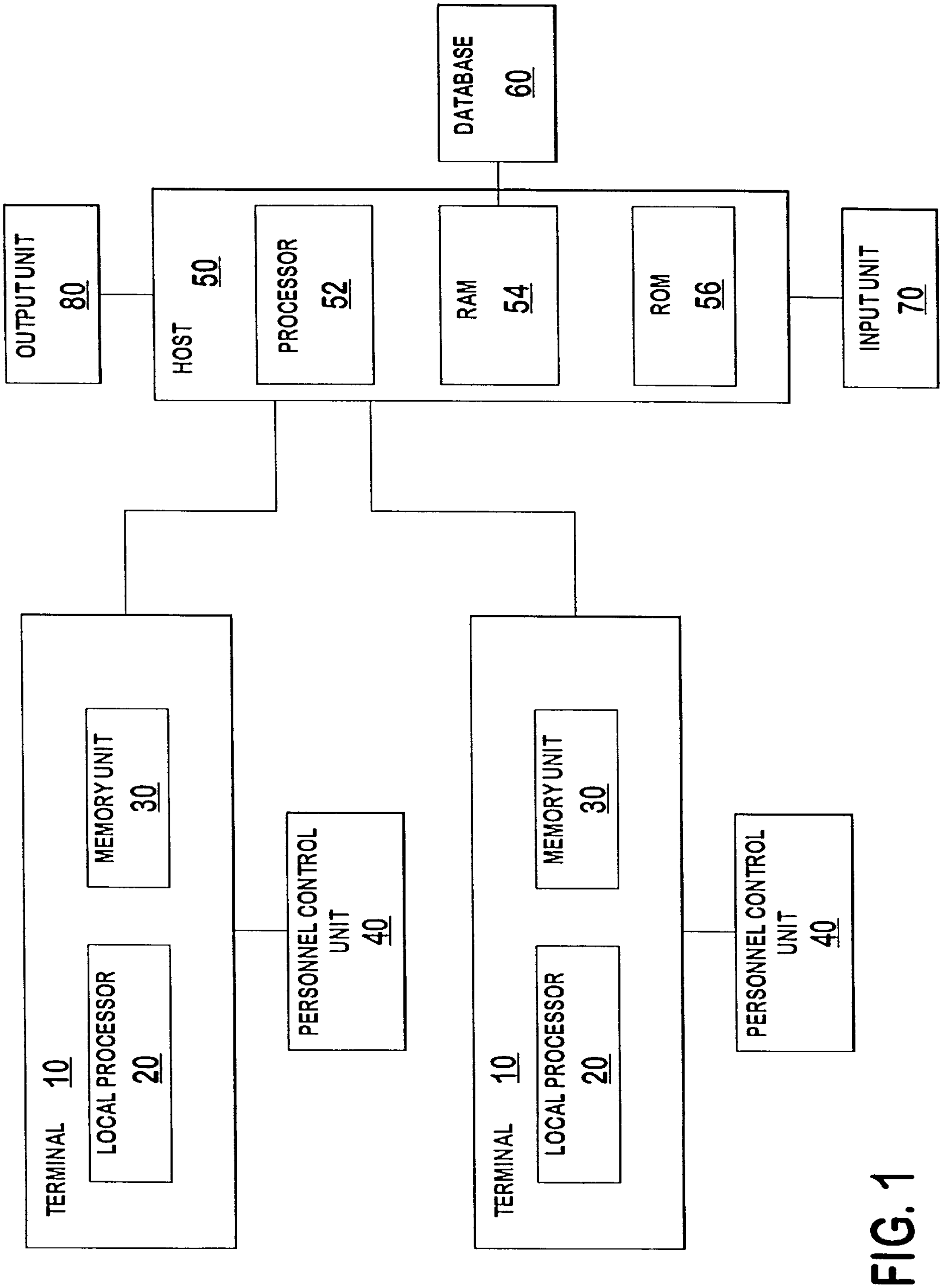
FIG. 1 is a block diagram of an embodiment of the present invention.

FIG. 1 shows a plurality of terminals 10 having a local processor 20 and memory unit 30. Each terminal 10 is substituted for an existing terminal and is preferably connected to an existing personnel control unit 40. The personnel control unit 40 controls access based upon a signal from the terminal 10. Each terminal 10 is also preferably connected to an existing host 50 which includes a processor 52, RAM 54 and a ROM 56. The host 50 is preferably programmed to permit access, entry and/or egress, for certain personnel based upon authorization information. Authorization information preferably includes a list of personnel controlled areas and times during which an individual is to be permitted access. For example, an individual may be permitted access only during a specified work shift. The authorization information would include the permitted area (s) and the permitted time(s) for that individual. Since the authorization information is under the employer's control, the permitted access area(s) and time(s) can be changed easily without the need for the issuance of a new individual identification card or a manual check of updated access information by security personnel. The host 50 has a database 60 for storing the authorization information and is connected to an input unit 70, such as a keyboard, and an output unit 80, such as a liquid crystal display.

Figure 2:
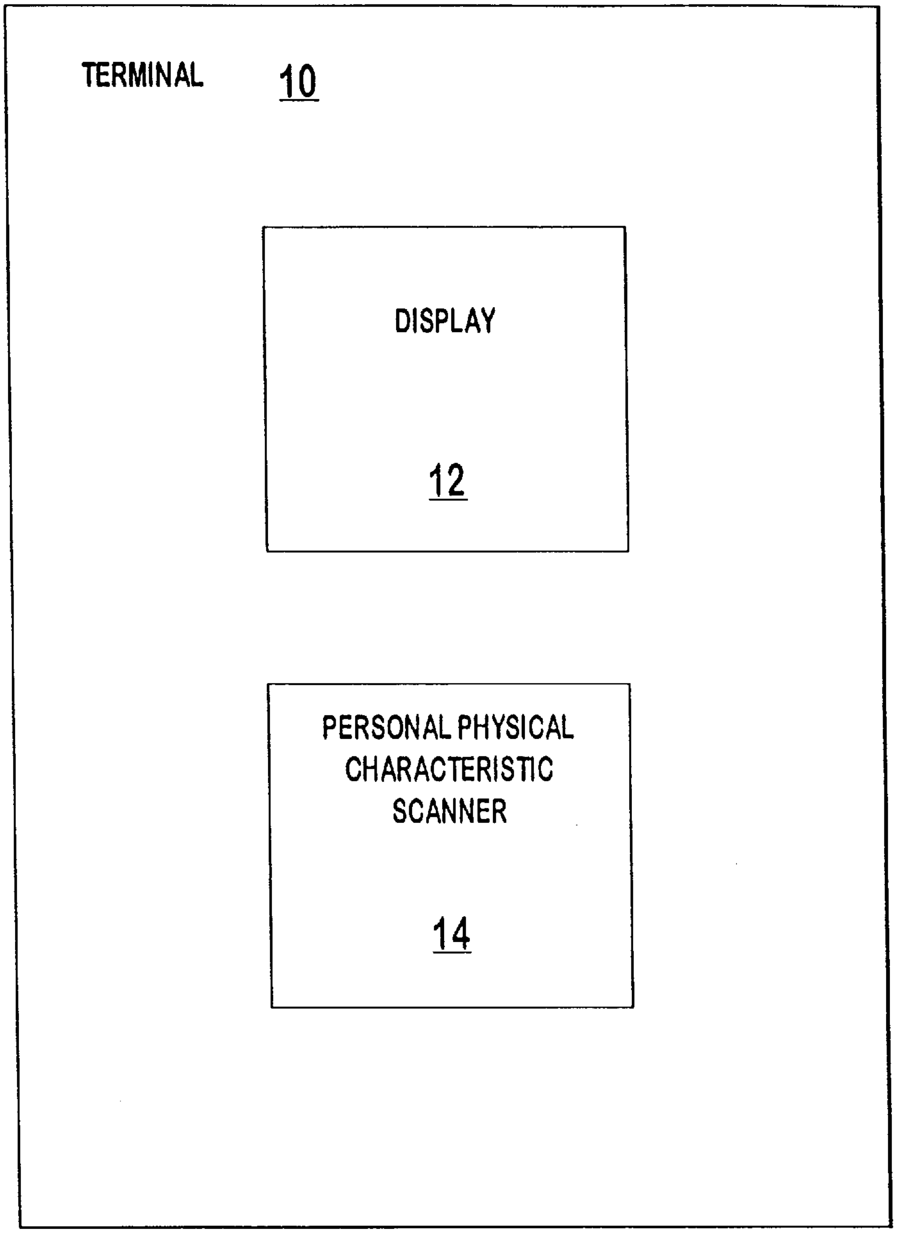
FIG. 2 is a block diagram of a front face of a first embodiment of a terminal of the present invention.

FIG. 2 is a diagram of a first embodiment of the terminal of the present invention. The terminal 10 includes a display 12 and a personal characteristic scanner 14 as well as the local processor 20 and memory unit 30. Examples of the personal characteristic scanner 14 include an epidermal topographical scanner and an eye scanner. Examples of epidermal topographical scanners include fingerprint scanners, knuckleprint scanners, handprint scanners and palmprint scanners. Examples of eye scanners include iris scanners and retina scanners. The personal characteristic scanner reads an individual's personal characteristic and generates a personal characteristic pattern which is compared to stored personal characteristic patterns.

Figure 3A:
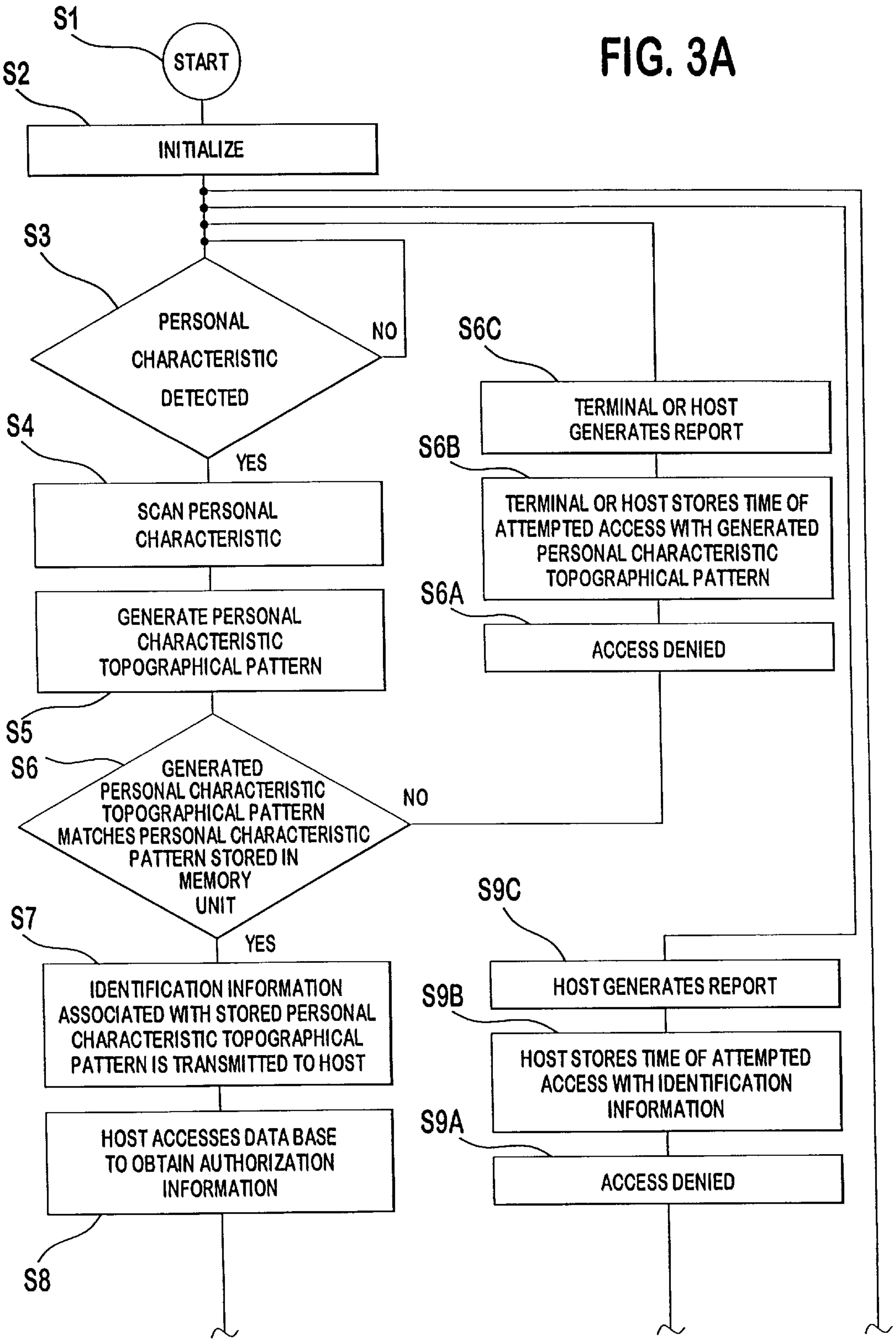
FIGS. 3A and 3B are diagrams of the steps of controlling access utilizing the terminal of the first embodiment of the present invention.
Figure 3B:
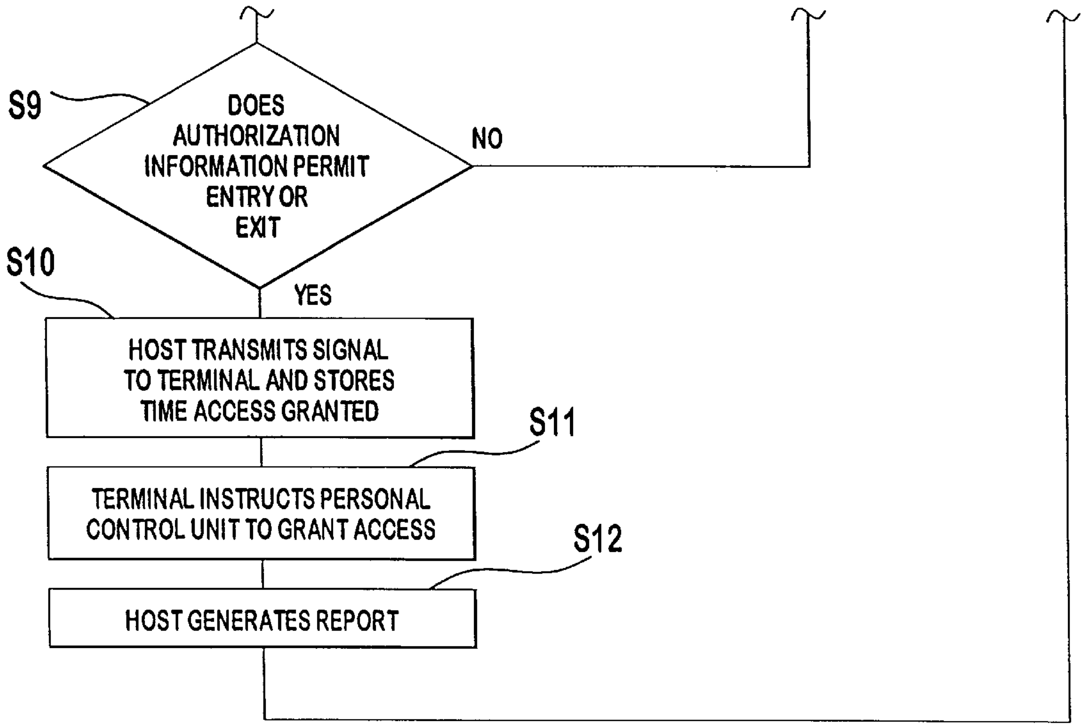

The operational flow of a first embodiment of the terminal 10 is shown in FIG. 3. After the terminal 10 is activated, the program is started (S1) and the system is initialized, preferably automatically (S2). When a personal characteristic is detected (S3), the personal characteristic scanner 14 scans the personal characteristic (S4) and a personal characteristic topographical pattern is generated (S5). The local processor 20 compares the generated pattern to a library of patterns stored in memory unit 30 (S6). If there is no match, access is denied (S6A). The terminal 10 may transmit the time of attempted access and the generated personal characteristic topographical pattern to the host 50 for storage in the database 60 (S6B). Alternatively, the terminal 10 may store the time of attempted access and the generated personal characteristic topographical pattern in the memory unit 30. The host 50 or terminal 10 may generate a report of the attempted access(S6C). Thereafter, the system returns to step S3.

If there is a match, identification information associated with the stored personal characteristic topographical pattern is transmitted to the host 50 (S7). The host 50 accesses the database 60 to obtain authorization information regarding the individual seeking access (S8). If the authorization information associated with the identification information in the database 60 permits access (S9), the host 50 transmits a signal to the terminal 10 and stores the access time (S10). The terminal 10 instructs the personal control unit 40 to grant access (S11) and the host 50 generates a report (S12), and the system returns to step S3.

If the authorization information does not permit access (S9A), the host 50 stores the time of attempted access with the generated physical characteristic topographical pattern in the data base 60 (S9B). The host 50 may also generate a report of the attempted access (S9C). Thereafter, the system returns to step S3.

It will be recognized that a principal advantage of the present invention is the ability to replace an existing access control device, such as a barcode scanner, with a personal characteristic identification control apparatus without the need for modifying the existing system. Since the present invention provides an output that is compatible with the existing system, the change will appear seamless to the current host. The ability to avoid the need for changes in software or hardware provides an economic advantage that greatly enhances the added feature of a physical characteristic identification system.

Figure 4:
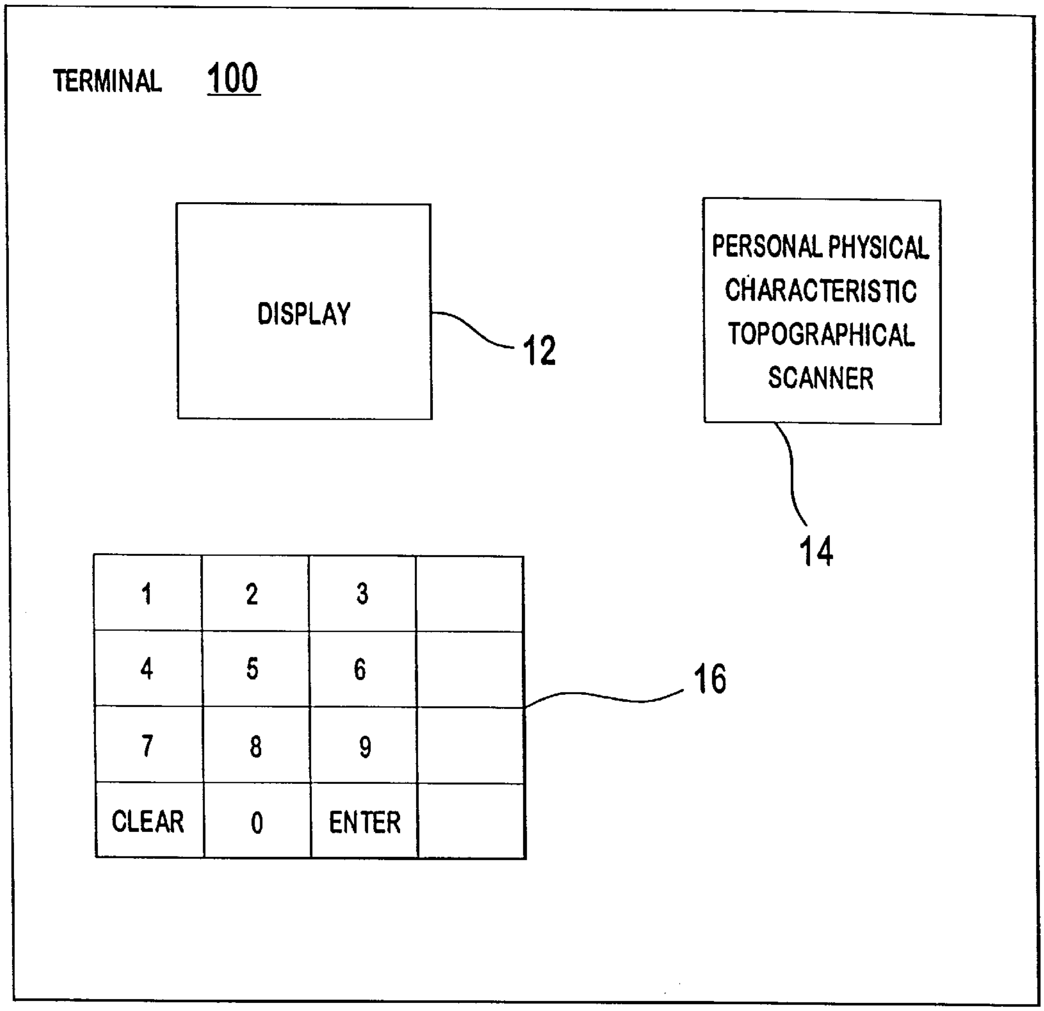
FIG. 4 is a block diagram of a front face of a second embodiment of a terminal of the present invention.

FIG. 4 is a diagram of a second embodiment of a terminal of the present invention. The terminal 100 preferably includes the same apparatus as terminal 10. In addition to the local processor 20, memory unit 30, display 12 and personal physical characteristic topographical scanner 14, the terminal 100 also includes a keypad 16 for receiving a personalized code, such as a PIN, which is required to gain access.

Figure 5A:
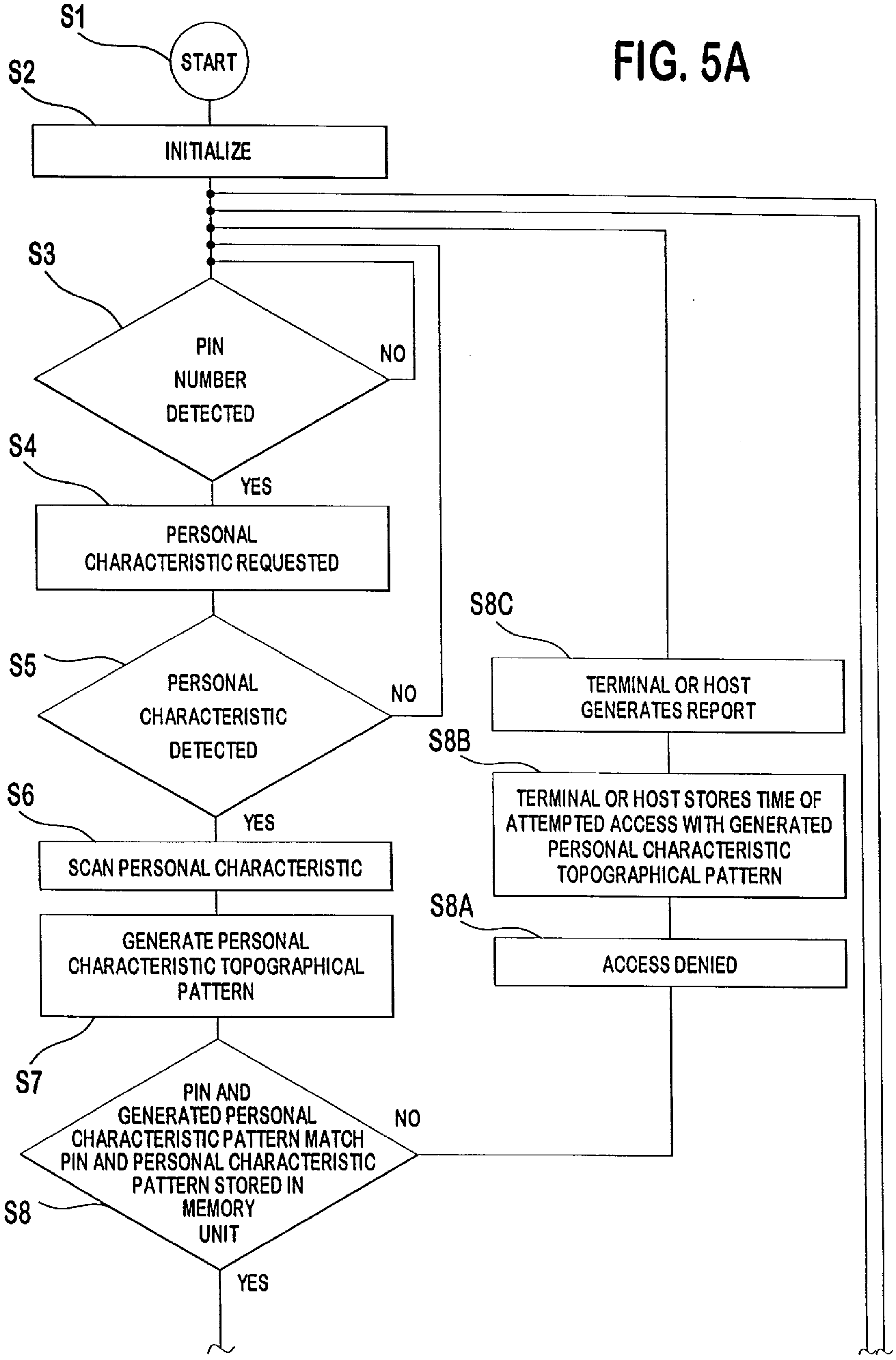
FIGS. 5A and 5B are diagrams of the steps of controlling access utilizing the terminal of the second embodiment of the present invention.
Figure 5B:
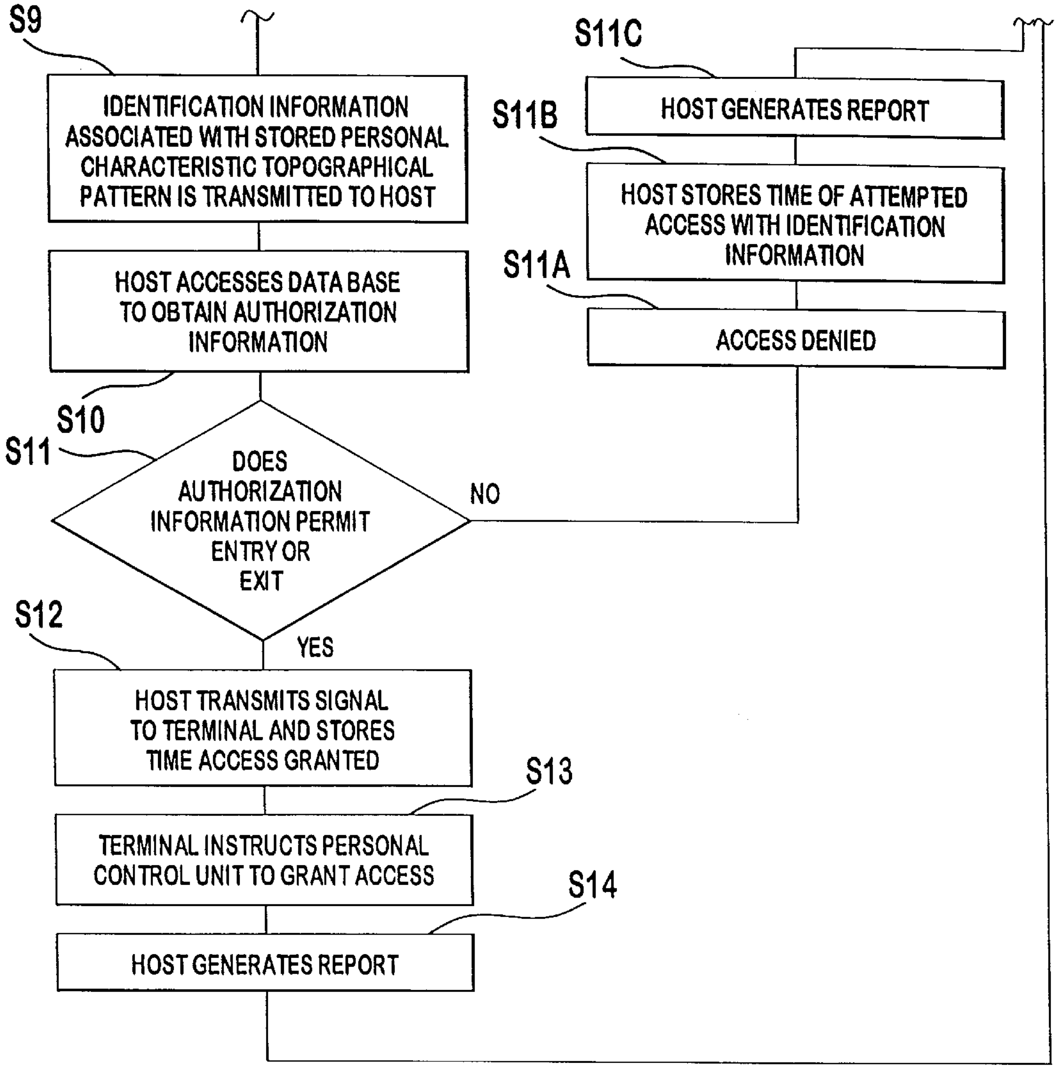

The operational flow of a second embodiment of the present invention utilizing terminal 100, is shown in FIGS. 5A–5B. After the terminal 100 is activated, the program is started (S1) and the system is initialized, preferably automatically (S2). When a personal code is detected (S3), the terminal 100 requests a personal characteristic (S4). When a personal characteristic is detected (S5), the personal characteristic is scanned (S6) by the scanner 14 and a personal characteristic pattern is generated (S7). The local processor 20 compares the newly generated personal characteristic pattern and personal code with the library of corresponding data stored in memory unit 30 (S8).

If there is no match, access is denied (S8A), and the host 50 or terminal 100 stores the time of attempted access with the generated physical characteristic topographical pattern in the data base 60 or memory unit 30 (S8B). The host 50 or terminal 100 may also generate a report of the attempted access (S8C). Preferably, the terminal 100 stores the information and generates the report. Thereafter, the system returns to step S3.

If there is a match, the identification information associated with the stored personal characteristic topographical pattern is transmitted to the host 50 in a format compatible with the existing system (S9). The host 50 accesses database 60 to obtain authorization information regarding the individual seeking access (S10). If the authorization information does not permit entry or exit, access is denied (S11A) and the host 50 stores the time of attempted access with the identification information (S11B). Subsequently, the host 50 generates a report (S11C) and the system returns to step S3.

If there is a match, the host 50 transmits a signal to the terminal 100 in the existing format and stores the time access is granted. The terminal 100 instructs the personal control unit 40 in the existing format to grant access (S13) and the host 50 generates a report (S14). Thereafter, the system returns to step S3.

Figure 6:
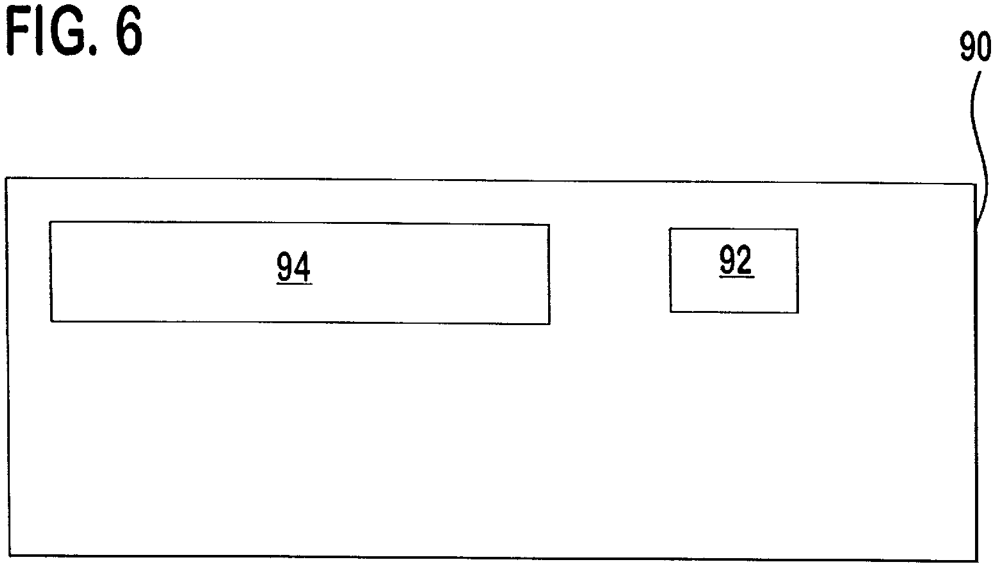
FIG. 6 is a block diagram of a typical card.
Figure 7:
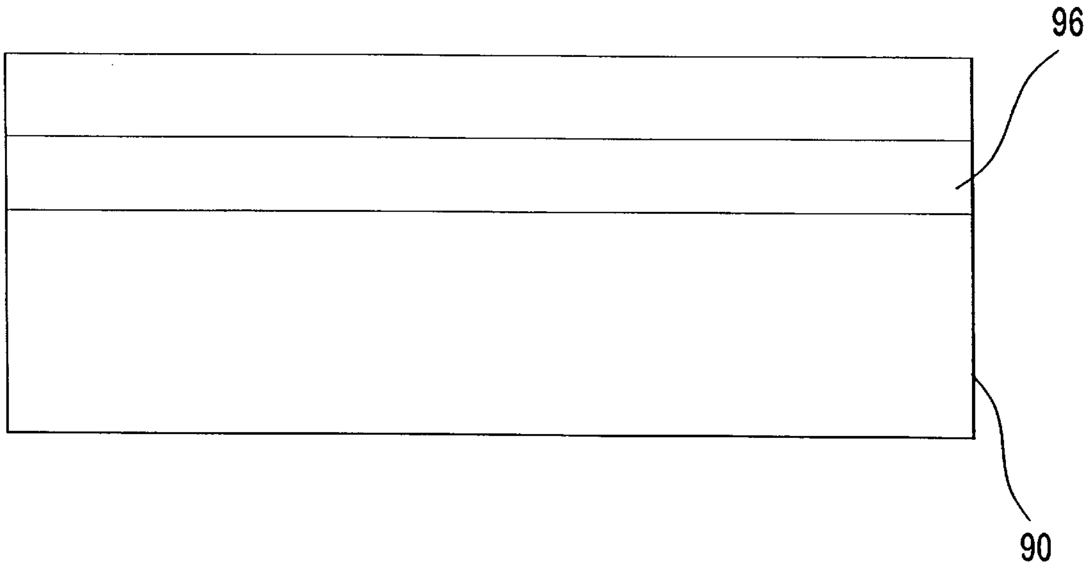
FIG. 7 is a block diagram of the rear face of the typical card.

FIGS. 6 and 7 show an example of an identification document 90, which is read by a terminal 200 (FIG. 8) in a third embodiment of the present invention. In order to gain access, an individual is required to present an identification document 90 having at least one machine readable medium. FIG. 6 shows the front face of an identification document 90 having a photograph 92 and a visible machine readable code 94. The identification document 90 may also contain personal identification information such as the bearer's name, eye color, personal characteristic information, etc. The same personal identification information may be encoded in a visible machine readable code 94. FIG. 5 shows the rear face of the identification document 90 which includes a magnetic stripe 96. Personal identification information from a front face of the identification document 90 and personal characteristic information are preferably encoded on the magnetic stripe 96.

Figure 8:
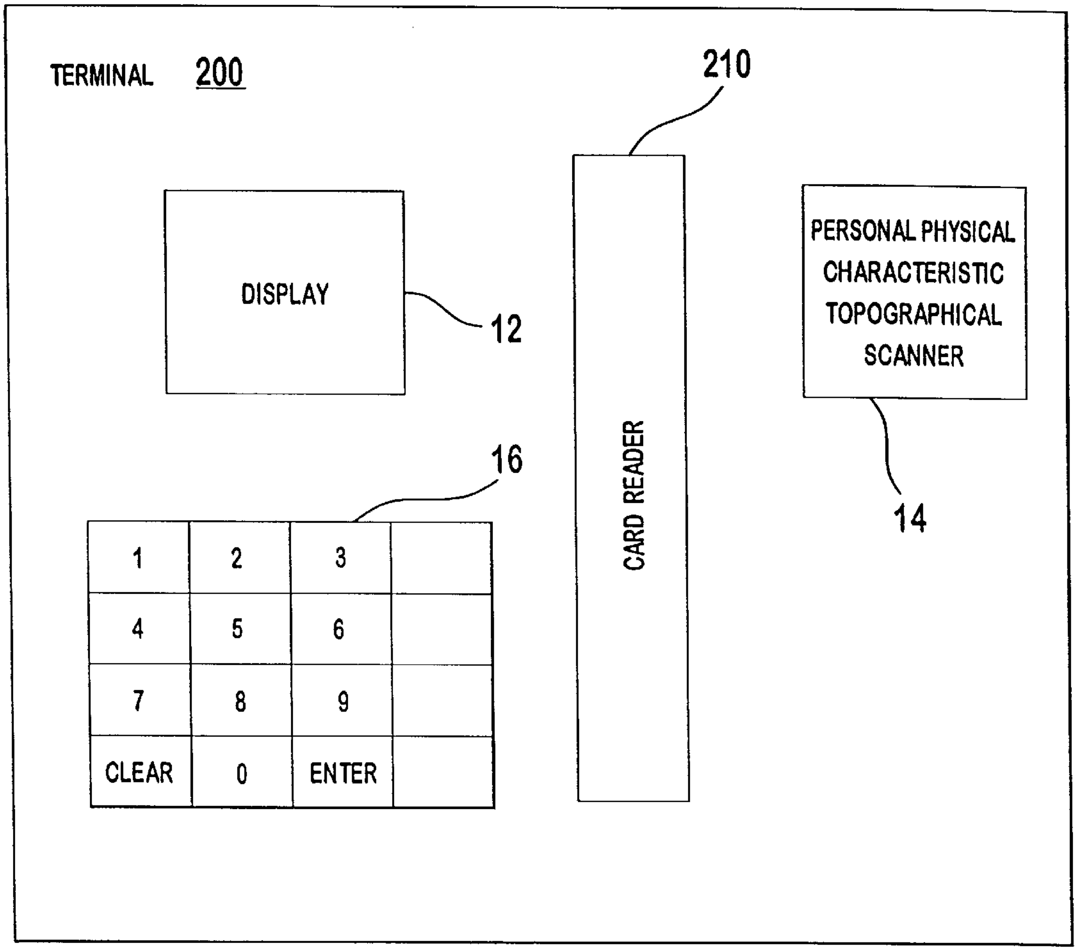
FIG. 8 is a block diagram of a front face of a third embodiment of a terminal of the present invention.

Referring to FIG. 8, a block diagram of a third embodiment of the present invention is shown. The terminal 200 is substituted for the terminal 10 in FIG. 1. In addition to the local processor 20, memory unit 30, display 12, and personal topographical scanner 14, the terminal 200 further includes a keypad 16 for receiving a personal code, such as a PIN, and a card reader 210 for reading either visible machine readable code 94 or encoded data on a magnetic stripe 96. The reader 210 may be configured to read both 94 and 96. The personal characteristic topographical scanner 14 reads a personal characteristic and generates a personal characteristic pattern.

Figure 9A:
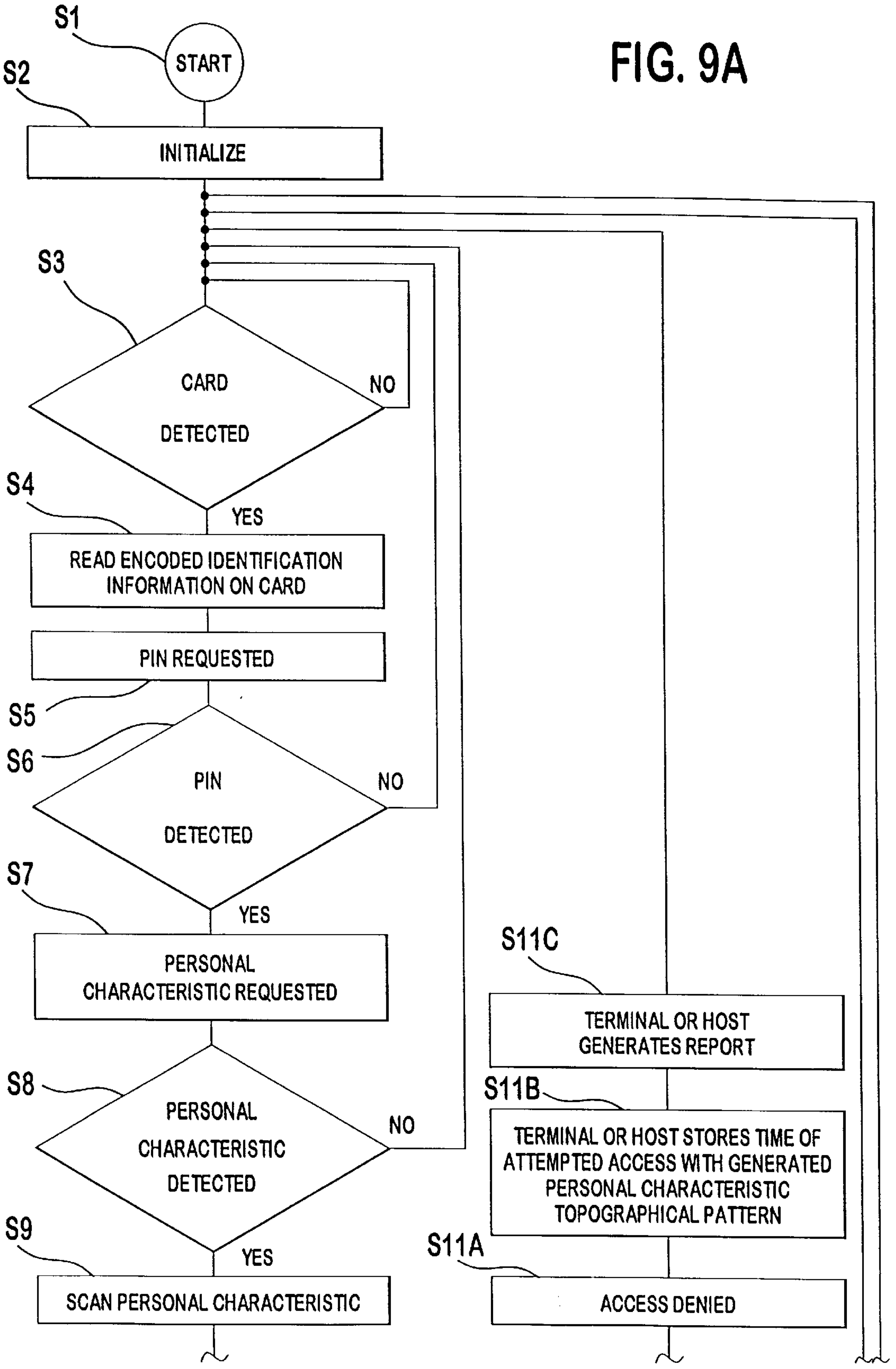
FIGS. 9A through 9C are diagrams of the steps of controlling access utilizing the terminal of the third embodiment of the present invention.
Figure 9B:
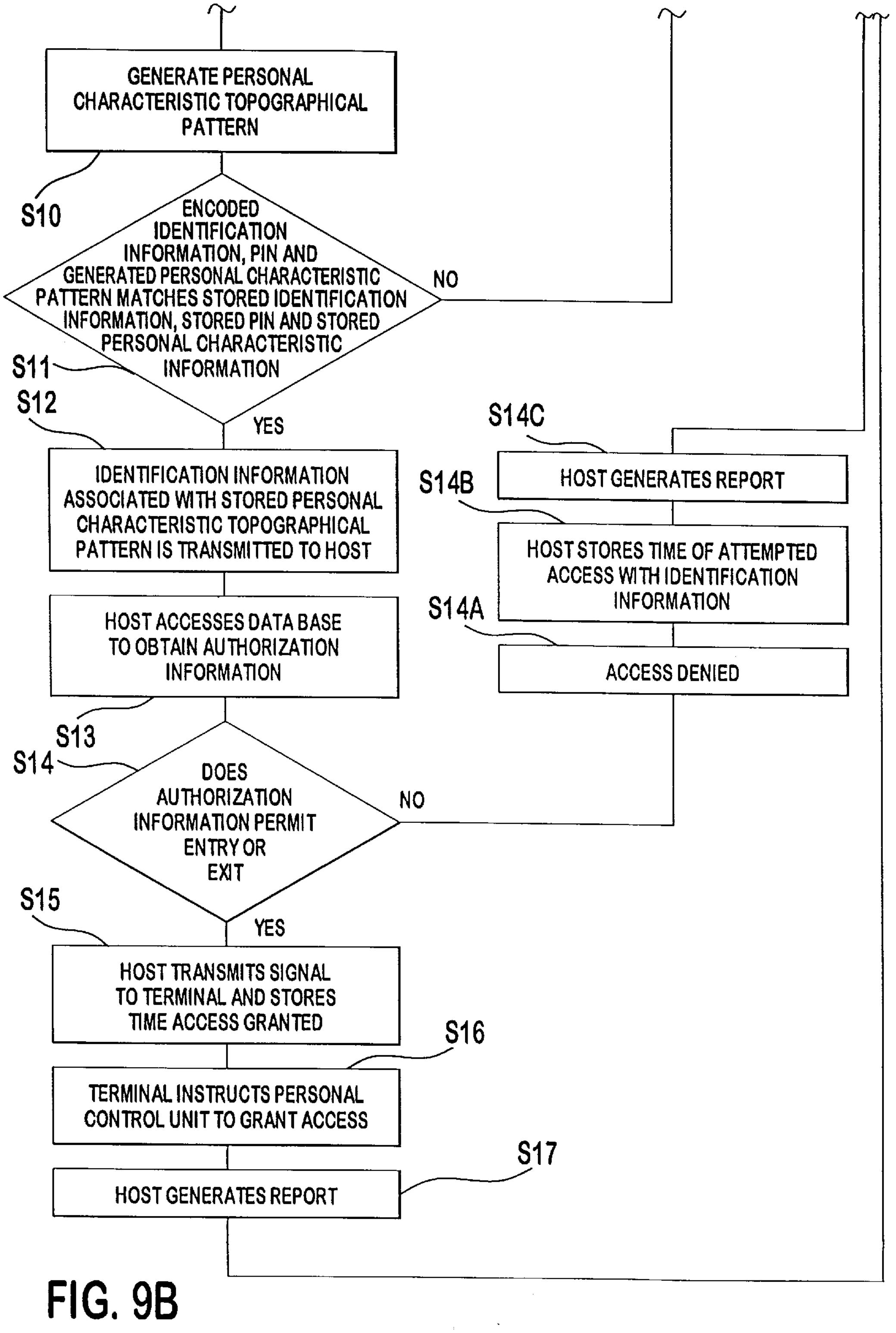
Figure 9C:
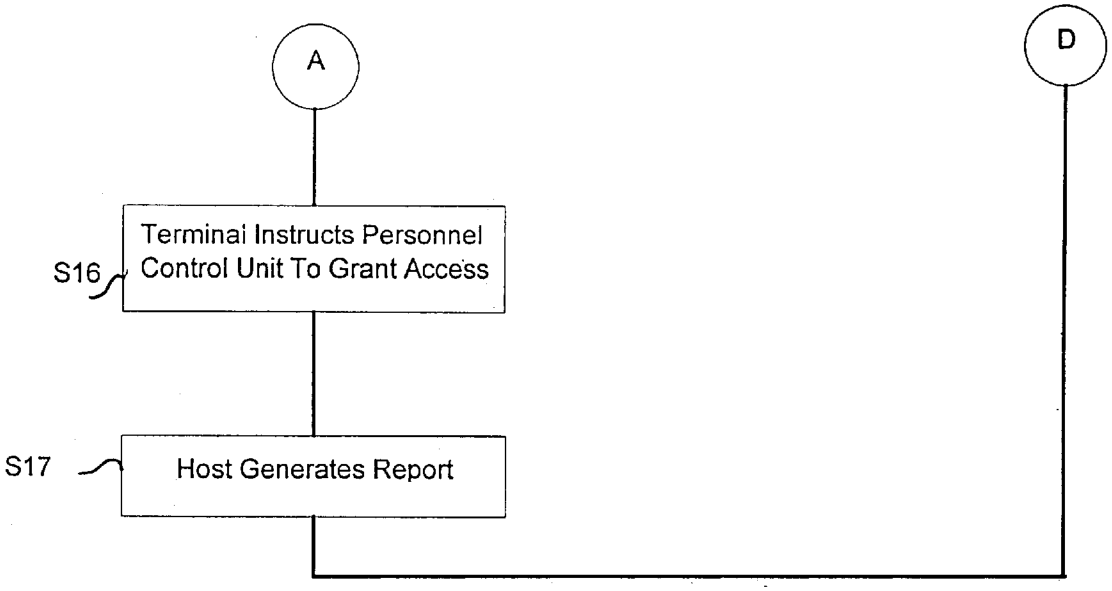

Operation of the third embodiment of the present invention is shown in the flowchart in FIG. 9. After the terminal 200 is activated, the program is started (S1) and the system is initialized, preferably automatically (S2). Once the identification document 90 is detected (S3), the identification document 90 is read to obtain encoded identification information (S4). A personal code is requested (S5). If a code is not entered, the system returns to step S3. If a code is detected, the system requests a personal characteristic (S7). If a personal characteristic is not detected by scanner 14, the system returns to step S3. If a personal characteristic is detected, it is scanned (S9) by scanner 14 and a personal characteristic pattern (S10) is generated.

If the encoded identification information, personal code, and generated personal characteristic pattern does not match the identification information, code, and personal characteristic information retrieved from memory unit 30, access is denied. The host 50 or terminal 200 stores the newly presented encoded identification information, code and generated personal characteristic information in database 60 or memory unit 30. The host 50 or terminal 200 generates a report (S11A–S11C), and the system returns to S3.

If the encoded identification information, code and generated personal characteristic pattern matches stored identification information, code and personal characteristic pattern retrieved from the memory unit 30, an identification information signal is transmitted to the host 50 (S12).

Once the host 50 receives the identification information signal, the host 50 accesses the database 60 to obtain authorization information (S13). If the authorization information does not permit entry, access is denied (S14A) and the host 50 stores time of attempted access with the identification information (S14B). The host 50 generates a report (S14C) and returns to step S3. If the authorization information permits entry, the host 50 transmits a signal in the existing format to the terminal 200 and stores the time access is granted. The terminal 200 instructs the personal control unit 40 in the existing format to grant access (S16). The host 50 generates a report (S17), and the system returns to step S3.

Figure 10A:
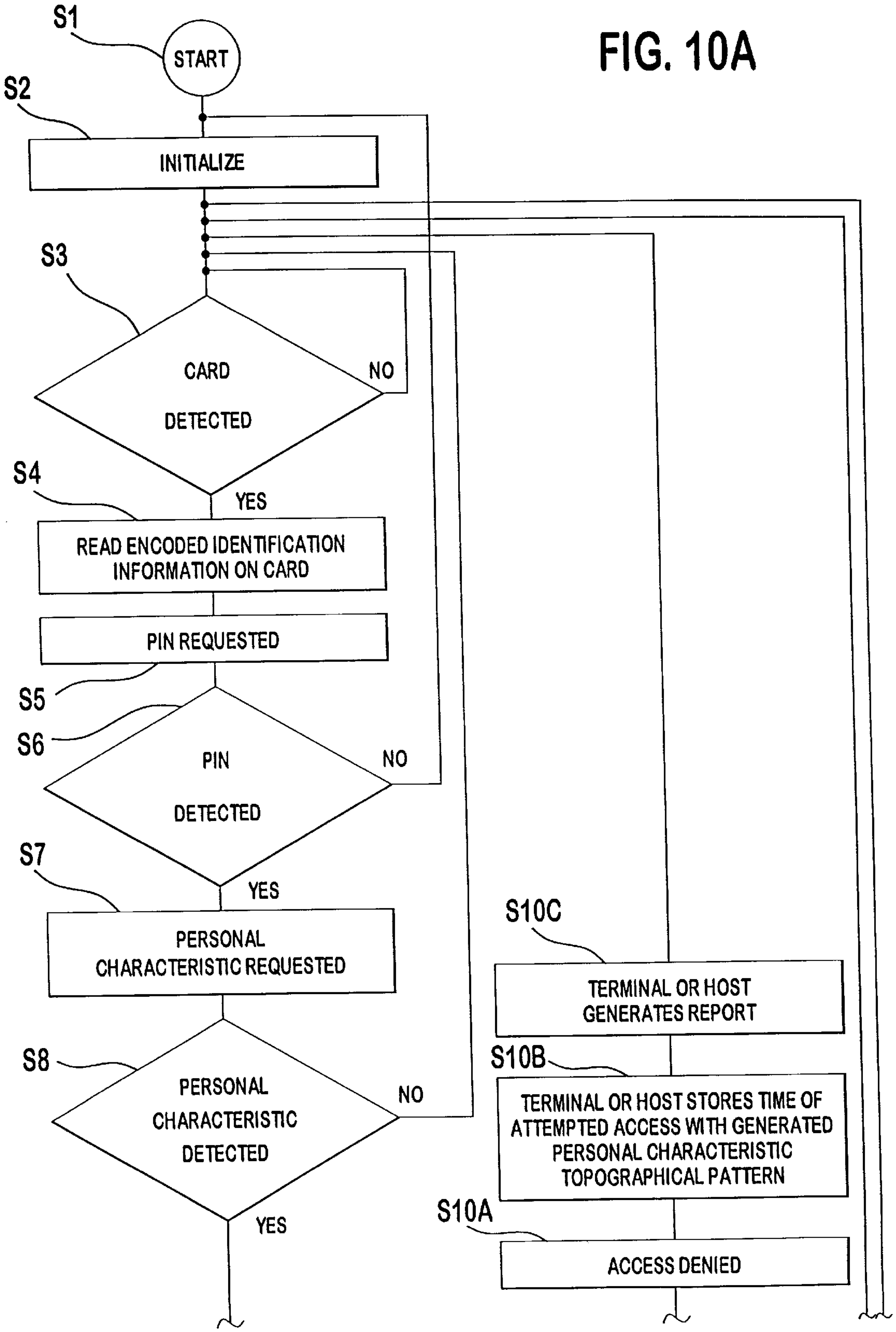
FIGS. 10A and 10B are diagrams of alternative steps of controlling access utilizing the terminal of the third embodiment of the present invention.
Figure 10B:
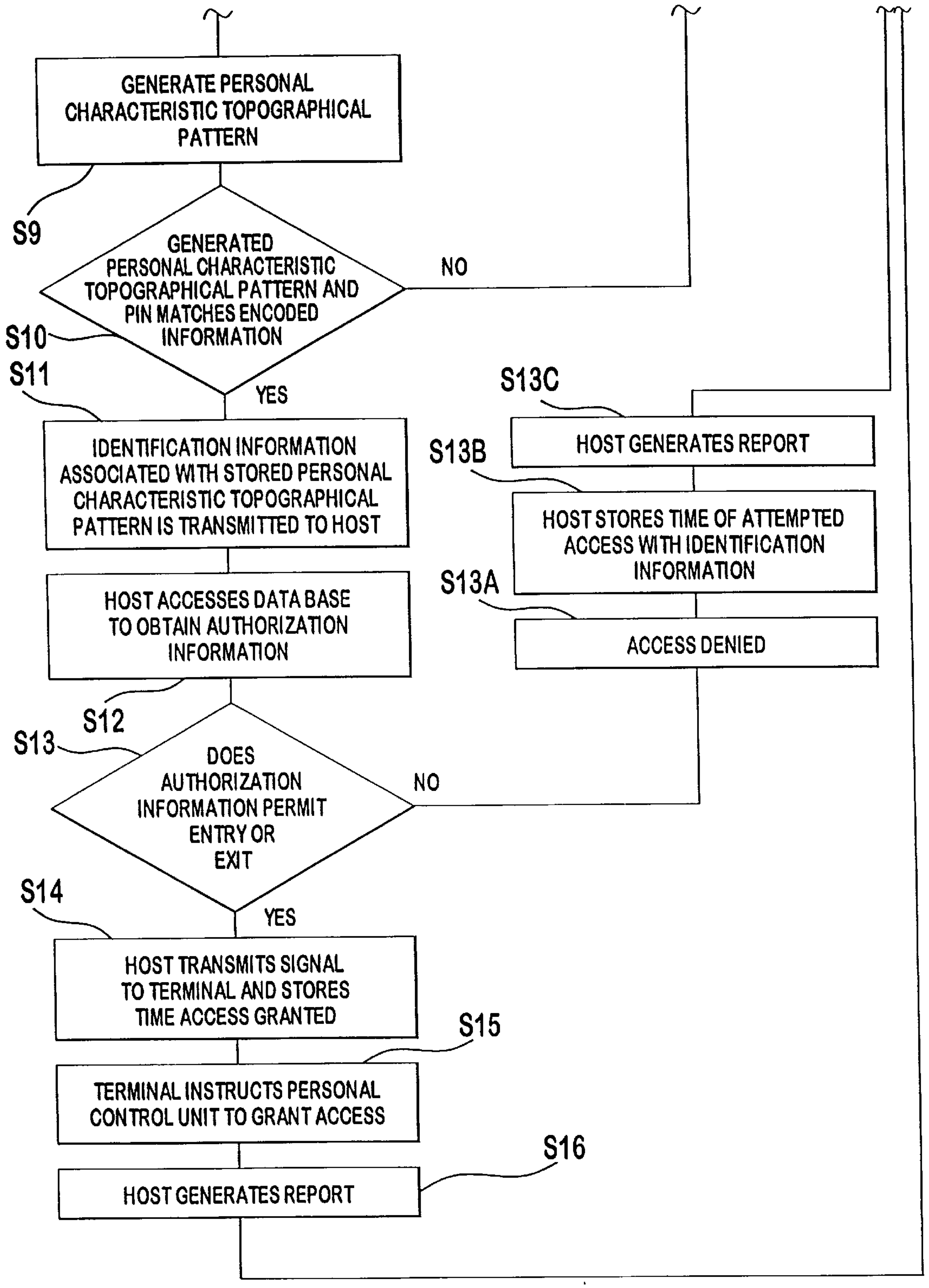

Alternatively, the same terminal 200 may be programmed to provide a fourth embodiment of the present invention. Operation of the fourth embodiment of the present invention is shown in FIG. 10. After the terminal 200 is activated, the program is started (S1) and the system is initialized, preferably automatically (S2). After the card is detected, the machine readable code is read or scanned to obtain the encoded personal characteristic information (S4). A personal code is requested (S5). If a code is detected, a personal characteristic is requested (S7). If the personal characteristic is detected (S8), a personal characteristic pattern is generated by scanner 14 (S10).

If there is no match, access is denied (S11A), and the host 50 or terminal 200 stores the time of attempted access with the generated physical characteristic topographical pattern in the data base 60 (S11B). The host 50 or terminal 200 may also generate a report of the attempted access (S11C). Thereafter, the system returns to step S3.

If the generated personal characteristic pattern matches the encoded information and personal identification number (S11), the identification information associated with the stored personal characteristic topographical pattern is transmitted to the host 50 (S8). The host 50 accesses the database 60 to obtain authorization information (S12). If the authorization information permits entry then the host 50 transmits a signal in the existing format to a terminal 200 and stores the time access is granted (S13–S14). The terminal 200 instructs the personnel control unit 40 to grant access (S15) in the existing format and the host 50 generates a report (S16). If authorization is not permitted, access is denied, the host 50 stores the time of attempted access and the host 50 generates a report (13A–13C). The system then returns to step S3.

I claim:

1. An apparatus for interfacing with an existing personnel control system that utilizes stored data in a predetermined format for the purpose of determining whether a presented individual is authorized to have access to a controlled area, the apparatus comprising:

means for storing physical characteristic information for a plurality of individuals;

means for storing for each individual, an access signal associated with the existing personnel control system;

means for scanning a physical characteristic of a presented individual;

means for generating a scanned physical characteristic signal for the presented individual;

means for comparing the stored physical characteristics information to the scanned physical characteristic signal to determine if a match is found;

means for outputting the access signal associated with the presented individual when a match is found; and means for communicating the outputted access signal to the existing control system in a format that is compatible with the predetermined format of the stored data so that the existing personnel control system will recognize the outputted access signal as a match for the presented individual stored data and authorize access to the controlled area.

2. The apparatus of clam 1 wherein the predetermined format of the existing personnel control system is compatible with information stored on a card.

3. The apparatus of claim 2 wherein the card has a magnetic stripe and the stored information is encoded thereon.

4. The apparatus of claim 2 wherein the stored information is encoded on the card in machine readable code.

5. The apparatus of claim 1 wherein the predetermined format of the existing personnel control system is compatible with a PIN.

6. The apparatus of claim 1 further comprising means for denying access when a match is not found.

7. The apparatus of claim 1 further comprising means for storing a time of attempted access and the scanned physical characteristic when a match is not found.

8. A biometric apparatus for interfacing with an existing personnel control system that utilizes stored data, in addition to biometric data, for the purpose of determining whether a presented individual is authorized to have access to a controlled area, the apparatus comprising:

means for storing biometric information for a plurality of individuals;

means for obtaining biometric information on a presented individual;

means for storing for each individual, an access signal associated with the existing personnel control system;

means for generating an obtained biometric information signal for the presented individual;

means for comparing the stored biometric information to the obtained signal to determine if a match is found;

means for outputting the access signal associated with the presented individual when a match is found; and means for communicating the outputted access signal to the existing control system in a format that is compatible with the stored data so that the existing personnel control system will recognize the outputted access signal as a match for the presented individual stored data and authorize access to the controlled area.

* * * * *

UNITED STATES PATENT AND TRADEMARK OFFICE
CERTIFICATE OF CORRECTION

PATENT NO : 5,995,014

DATED : November 30, 1999

INVENTOR(S) : DiMaria et al.

It is certified that error appears in the above-identified patent and that said Letters Patent is hereby corrected as shown below:

ON THE TITLE PAGE
Left column, item [75], after "Inventor: Peter C. DiMaria, Ellington" insert --James T. Madsen, Enfield, both of--.

IN THE CLAIMS
Claim 2, column 7, line 15, delete "clam" and insert therefor --claim--.

Signed and Sealed this

Twelfth Day of December, 2000

*Attest:*

Q. TODD DICKINSON

*Attesting Officer*

*Director of Patents and Trademarks*